United States Patent
Angle et al.

(10) Patent No.: US 11,061,920 B2
(45) Date of Patent: Jul. 13, 2021

(54) APPLICATION PROGRAMMING INTERFACES ("APIS") FOR ACCESSING AND AMALGAMATING DATA FROM INCONGRUENT SOURCES

(71) Applicant: Opus Global, Inc., New York, NY (US)

(72) Inventors: Michael David Angle, Warwick, NY (US); Albert Tamayev, Queens, NY (US); Steve Ortman, New York, NY (US); Simon Vileshin, Brooklyn, NY (US)

(73) Assignee: OPUS GLOBAL, INC., Palo Alto, CA (US)

( * ) Notice: Subject to any disclaimer, the term of this patent is extended or adjusted under 35 U.S.C. 154(b) by 182 days.

(21) Appl. No.: 16/297,908

(22) Filed: Mar. 11, 2019

(65) Prior Publication Data

US 2019/0303378 A1    Oct. 3, 2019

Related U.S. Application Data

(60) Provisional application No. 62/649,030, filed on Mar. 28, 2018.

(51) Int. Cl.
| | |
|---|---|
| G06F 16/25 | (2019.01) |
| G06F 16/28 | (2019.01) |
| H04L 9/32 | (2006.01) |
| G06F 16/901 | (2019.01) |
| H04L 29/08 | (2006.01) |
| G06F 16/22 | (2019.01) |

(52) U.S. Cl.
CPC ........ *G06F 16/252* (2019.01); *G06F 16/2272* (2019.01); *G06F 16/288* (2019.01); *G06F 16/9024* (2019.01); *H04L 9/32* (2013.01); *H04L 67/141* (2013.01)

(58) Field of Classification Search
None
See application file for complete search history.

(56) References Cited

U.S. PATENT DOCUMENTS

| | | | |
|---|---|---|---|
| 9,699,158 B2 * | 7/2017 | Goodwin | H04L 63/126 |
| 2012/0173537 A1 * | 7/2012 | Shaffer | H04M 15/06 |
| | | | 707/741 |

(Continued)

*Primary Examiner* — Kim T Nguyen
(74) *Attorney, Agent, or Firm* — Pearl Cohen Zedek Latzer Baratz LLP

(57) ABSTRACT

A system for accessing and amalgamating entity data from a plurality of inconsistent data sources may be provided. The system may include a plurality of databases. The plurality of databases may include a first database and a second database. The first database may include a first plurality of entity datasets. Each entity dataset of the first plurality of entity datasets may relate to an entity. The first database may include a first database identifier for each entity dataset. The second database may include a second plurality of entity datasets. Each entity dataset of the second plurality of entity datasets may relate to an entity. The second database may include a second database identifier for each entity dataset. One entity dataset included in the first database may relate to the same entity as an entity dataset included in the second database. The system may include an indexing system.

20 Claims, 1 Drawing Sheet

(56) References Cited

U.S. PATENT DOCUMENTS

| | | | |
|---|---|---|---|
| 2013/0332344 A1* | 12/2013 | Weber | G06Q 20/20 |
| | | | 705/39 |
| 2015/0012435 A1* | 1/2015 | Ramavarjula | G06Q 20/4016 |
| | | | 705/44 |
| 2017/0006469 A1* | 1/2017 | Palanigounder | H04L 9/0891 |
| 2017/0078874 A1* | 3/2017 | Lee | H04W 12/043 |
| 2018/0013782 A1* | 1/2018 | Choyi | H04L 63/083 |
| 2018/0041946 A1* | 2/2018 | Park | H04L 63/08 |
| 2018/0048631 A1* | 2/2018 | Waltermann | H04L 63/10 |

* cited by examiner

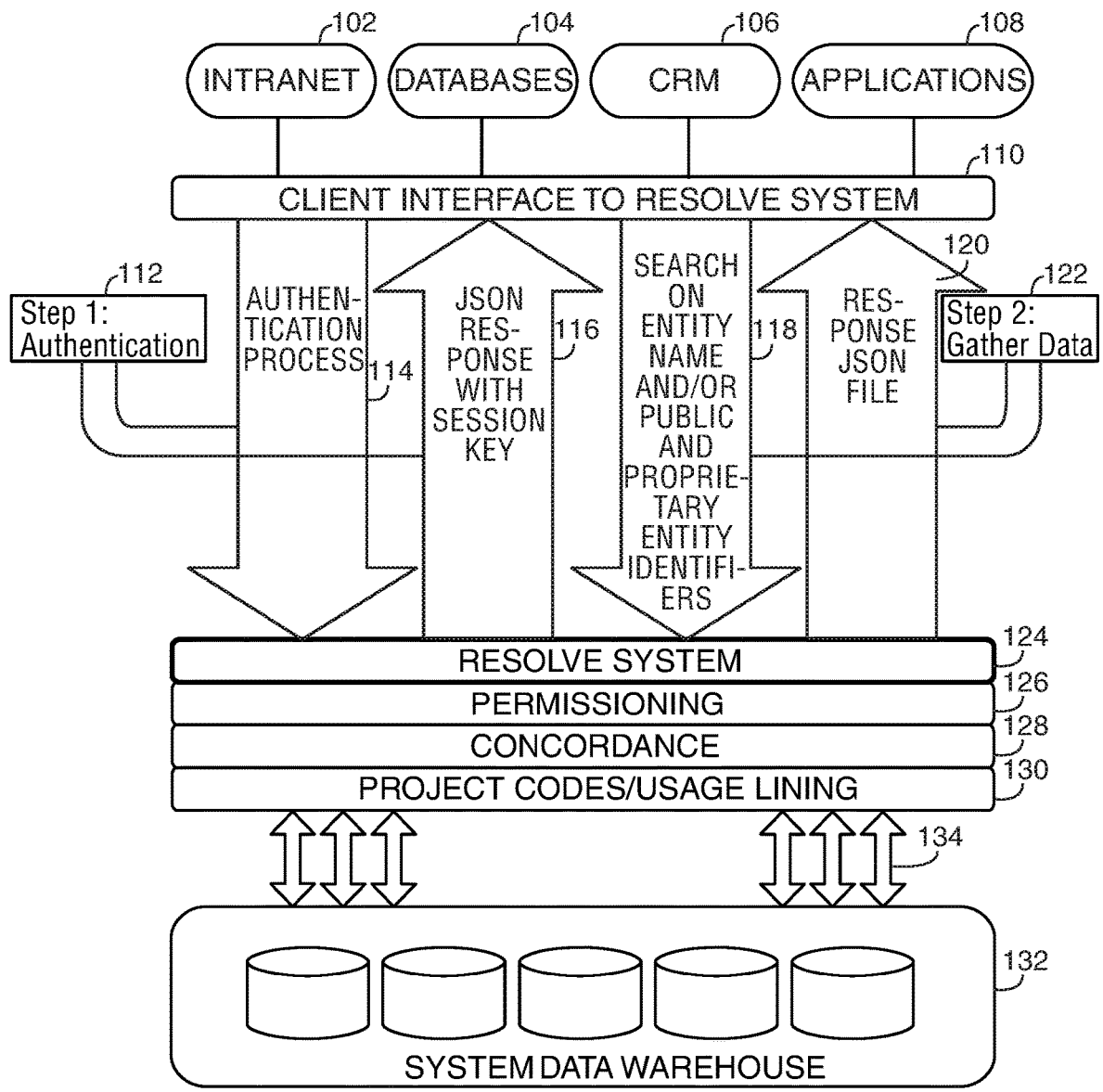

APPLICATION PROGRAMMING INTERFACES ("APIS") FOR ACCESSING AND AMALGAMATING DATA FROM INCONGRUENT SOURCES

CROSS-REFERENCE TO RELATED APPLICATION

This application is a non-provisional of U.S. Provisional Patent Application No. 62/649,030, which was filed on Mar. 28, 2018, and is hereby incorporated by reference herein in its entirety.

FIELD OF TECHNOLOGY

This application relates to application programming interfaces ("APIs"). Specifically, this application relates to APIs for use with disparate data sources.

BACKGROUND OF THE DISCLOSURE

Many times, users and/or systems require data and/or information relating to an entity. The data and/or information may be used by the users or systems for various purposes. The purposes may include on-boarding new clients, on-boarding new vendors, appraising existing clients, appraising existing vendors, assessing distributors, assessing business partners, assessing entities for investment purposes and any other suitable purpose.

Typically, data and/or information relating to numerous entities are present in various different, unrelated databases. The different databases may include proprietary, confidential and/or public data.

Users and/or systems conventionally search for data and/or information, relating to another entity, by accessing one or more of the available databases. The available databases may be unrelated, and may not share a common entity identification system. Therefore, a searching entity may be required to retrieve information regarding each entity using the unique numbering catalog of each underlying database.

Because of the lack of a common identification system and because different entities may share a name and/or other identification data, as well as other reasons, it may be difficult to determine whether entity data, retrieved from a first database, is associated with the same entity as entity data retrieved from a second database. Therefore, it may occur, when a searching entity is retrieving data relating to a specific entity, that, entity data relating to a first entity is retrieved from a first database, and entity data relating to a second entity is retrieved from a second database. Thus, the first entity and the second entity may be confused for the same entity. As such, the searching entity may retrieve inconsistent data. The searching entity may then execute incorrect executables or make faulty decisions based on the retrieved inconsistent data.

Therefore, it would be desirable to provide a system that amalgamates entity data from a plurality of incongruent databases. It would be further desirable for the system to include an application programming interface ("API"). The API may enable a system user to access the amalgamated data. It would be yet further desirable for the system to include a single, or unique, identifier for each entity. The unique identifier may be used to identify the entity across the entirety of the amalgamated databases.

SUMMARY OF THE DISCLOSURE

A system for accessing and amalgamating entity data from a plurality of incongruent data sources is provided. The system may include a plurality of databases. The plurality of databases may include a first database. The first database may include a first plurality of entity datasets. Each entity dataset may relate to an entity. The first database may include a first database identifier for each entity dataset included in the first plurality of entity datasets.

The plurality of databases may include a second database. The second database may include a second plurality of entity datasets. Each entity dataset may relate to an entity. The second database may include a second database identifier for each entity dataset included in the second plurality of entity datasets.

It should be appreciated that, although two databases with two sets of database identifiers are discussed above, more databases with more sets of database identifiers are contemplated within the scope of the disclosure.

At least one entity dataset included in the first database may relate to the same entity as at least one entity dataset included in the second database. In an embodiment that includes two or more databases, entity datasets included in each database may relate to the same entity as entity datasets included in the other databases. However, the database identifier used to identify one specific entity may be different in each of the various databases.

The system may include an indexing system. The indexing system may generate a universal identifier for each entity. The indexing system may link each generated universal identifier to one or more appropriate database identifiers. The universal identifier may be used to query each of the various databases.

In order to ascertain that the indexing system has correctly identified an entity in each of the disparate databases, the system may execute a two-step process. The two-step process may be executed prior to the linking of a universal identifier to a database identifier.

The two-step process may include determining a match between two or more database identifiers for a single entity based on one or more criterion included in a plurality of internal criteria. The plurality of internal criteria may include entity name; geographic data, for example, one or more street addresses, one or more postal codes and other suitable geographic data; contact data, for example, one or more telephone numbers, one or more uniform resource locators ("URLs") and other suitable contact data; broad classification codes, for example, standard industrial classification codes ("SICs") and other suitable classification codes and any other suitable criteria.

The plurality of internal criteria may also include former values of the criteria, for example, a legacy name and previous address. The plurality of internal criteria may also include colloquial versions of the criteria, for example, an entity nickname and an entity fictitious name.

The plurality of internal criteria may also include information related to the entity. The information related to the entity may include other entities related to the entity. The other entities may be related to the entity through ownership or any other suitable relationship. The information related to the entity may include persons associated with the entity, for example, owners, directors and/or executives.

Upon determination of a match between two or more database identifiers, the system may score the match. Scoring the match may be based on a metric of correspondence between the entity datasets. When the score is determined to be higher than a predetermined threshold, the system may solidify the match.

Solidifying the match may include linking one database identifier to a universal identifier for an entity. Solidifying the match may also include linking each two database identifiers, from two distinct databases, to a single universal identifier for an entity.

When the determined score is less than the predetermined threshold, the matched data—i.e., the universal identifier and the entity dataset—may be transmitted for operator review. Upon operator review, the operator may instruct the system whether to solidify or dissolve the match. Upon match solidification, the matched identifiers and the universal identifier may be stored in a reference/concordance database.

In some embodiments, when the determined score is less than the predetermined threshold, the system may quarantine the match and attempt to re-score the match after a predetermined time period. In the event that the re-scoring produces a score above the predetermined threshold, the match may be solidified. In the event that the re-scoring produces a score below the predetermined threshold, the match may be dissolved.

It should be appreciated that, at times, an entity dataset may be unique to a specific database, for e.g., an entity may only be located in one database. In these instances, the system may indicate that this entity is only located in one database. The system may assign the entity a universal identifier. The assigned universal identifier may only reference one entity within one database.

The indexing system may associate each database identifier with the appropriate universal identifier for each entity. The database identifier may be a first database identifier, a second database identifier or any other suitable database identifier. In some embodiments, one or more database identifiers may be determined to be the universal identifier. In other embodiments, one or more database identifiers may be included within the universal identifier.

A user, system or entity may be able to search the indexing system to retrieve data and/or identifiers relating to an entity. In some embodiments, the user may enter, via a keyboard, computer mouse or other entry method, entity search data into a search box. In other embodiments, a user may type entity search data into a search box. The entity search data may include an entity name, a database identifier and/or any other data. In response to entering the entity search data, the user, system or entity may expect receipt of entity data, database identifiers and/or a universal identifier relating to the entity search data.

In order to facilitate a fast search lookup, the indexing system may include, for every possible letter combination, a subset of entities that match the letter combination. Expressed in a different way, the system may precompute, for every possible sequence of letters and/or characters, all entities that match the sequence of letters and/or characters. The indexed subset of entities may include legacy names, common abbreviations of entity names, entity names and any other suitable information. An example of use of the indexing system may be, for the letter combination M the system may precompute all entities that include the letter combination Min one or more data fields. In another example, for the letter combination, Mi, the system may precompute all entities that include the letter combination Mi in one or more data fields.

The indexing system may limit the result set—e.g., entities that include the letter combination Mi—to a specific number. The number may be twenty, fifty, two hundred or any other suitable number.

The indexing system may present the order of the result set may be based on various criteria. The criteria may include proprietary or confidential data associated with the requesting user or system. The criteria may include data relating to the entities included in the result set, such as market cap, number of employees, revenue or any other suitable data. The system may also limit the database identifiers included in the result set to databases to which the requesting user or system subscribes and/or is licensed.

The precomputation may enable the result set to be presented to a user, system or entity in a relatively brief time period. The time period may be less than a predetermined time period. Presenting the result set in a relatively brief time period may be referred to colloquially as a fast lookup.

The precomputation may also enable a type-ahead search functionality. The type-ahead search functionality may enable a display of a list of user-selectable entity choices. The display may be initiated upon receipt of one or more characters in the search box. The display may be initiated based on historical queries received from the user. The displayed list of user-selectable entity choices may change as the user is typing a query. The displayed list may change based on input received from the user. The list of user-selectable entity choices may present the user with possible matches to the user's query as the user is typing the query. In an example, a user may enter the letter combination A into the search box. The user may have intended to retrieve data regarding Acme Corporation, however, the system may display to the user both Acme Corporation and LEI number AA12XXXXX. The user may select Acme Corporation in order to view details about Acme Corporation, or the user may continue to type more characters into the search box, such as CME (which follows after the A), In some embodiments, the indexing system may include multiple indexes. Each index may be associated with a different database. Because a different permission set and/or license may be required to access to each database, in order to access each index, the permission set and/or license of the associated database may be required. In these embodiments, a result set presented to a searching entity or user may be based on the permission sets and/or licenses of the searching entity or user. The multiple indexes may enable the indexing system to present the licensed or authorized result set to the searching entity or user.

In some embodiments, the indexing system may include and/or be associated with an application programming interface ("API"). The API may enable users to request universal identifiers, databases identifiers and/or any other suitable identifier data from the indexing system. The API may also enable users to access one or more of the plurality of databases using the retrieved identifier data. The API may provide a gateway to a system user to retrieve data from a plurality of databases.

It should be appreciated that, in some embodiments, one or more databases may not be included and/or accessible from within the system and/or API. In these embodiments, the API may return entity identifiers. Also, according to these embodiments, the indexing system may index identifiers, and not data associated with the identifiers.

The API may be a portion of a system through which access to various content publishers is provided. The API may be integrated into one or more intranets, portals, systems and/or applications. The API may incorporate licensing entitlements, content filtering and project coding into the data being returned.

The API may be accessed by different types of requests. For example, the API may enable receipt of three different types of requests and/or a combination of the three different types of requests.

A first type of request may be a type-ahead request. The type-ahead request may enable type-ahead search functionality, as described above. The type-ahead search may return entity names, former names, tickers, Committee on Uniform Securities Identification Procedures numbers (CUSIPs), legal entity identifiers (LEIS) and other public, confidential or proprietary identifiers.

A second type of request may be a parameterized search string request. The parameterized search string request may return a list of universal and/or database identifiers. The parameterized search string request may also return data on one or more entities.

A third type of request may be a single or multiple entity data request. The single or multiple entity data request may return entity data regarding one or more specific entities. The single or multiple entity data request may accept a plurality of parameters, such as a universal or database identifier.

A data warehouse, and or reference data/concordance database, may be used to provide data to the API. The data warehouse may contain data and/or references to data. The data and/or references to data may be retrieved from a plurality of content publishers. Many different content publishers may be included in the plurality of content publishers. The reference data/concordance database may be included in, or associated with, the indexing system. The concordance database may include the mapping of various database identifiers to a universal identifier. The mapping may facilitate the development of cross-database applications.

The API may leverage the indexing system, data warehouse and/or reference data/concordance database in order to deliver data and/or references to data to a user.

The system may also enable integration of internal and/or external content. The external content may be made available using hypertext transfer protocol ("HTTP") or hypertext transfer protocol secure ("HTTPS"). The returned content may reflect content licensing, concordance mapping, data filtering and content packaging. The returned content may be combined into a single XML feed, JSON feed or any other suitable feed.

The system may provide a single point of access to multiple sources of content. The system may return the content in various forms, such as an eXtensible Markup Language ("XML") file, a JavaScript Object Notation ("JSON") file or any other suitable file or document. An XML file is versatile, and may be read by a variety of applications.

XML is a general-purpose specification for creating custom markup languages. XML may be classified as an extensible language because it allows its users to define their own elements. One purpose of the use of XML may be to facilitate sharing structured data across different information systems, particularly via the Internet. XML may be used to encode documents and to serialize data.

A JSON file may have similar advantages to an XML file, however, the JSON file may be more consumable by web browsers. For example, an XML file may require a defined schema, and a JSON file may not require a defined schema. As such, a user may not be required to know the structure of data prior to receiving a JSON file. Therefore, a JSON file may be useful for retrieving data from various different datasets.

The system and the API may enable users to leverage existing content licensing relationships. Benefits of the system and the API may include project code tracking and extensive usage reporting. The system may be a flexible entitlement system. The system may accept a variety of public entity identifiers, such as the following identifiers: ticker, CUSIP, Stock Exchange Daily Official List ("SEDOL") identifier, International Securities Identification Number ("ISIN"), Legal Entity Identifier ("LEI") and any other suitable identifier.

The system may accept key words, industry taxonomy and country codes as input parameters. Because the system may provide access, via the API, to the database warehouse through a network, such as the internet, in some embodiments, the system may eliminate the need for a local server containing a third-party database. As such, an application may retrieve data wherever the application is deployed.

Database updates, corrections and format changes may be handled by the system. The system may update the data as frequently as the content publisher or source provides updates and/or makes updates available. Many content publishers' databases may be updated daily. Therefore, the system's data warehouse may be updated daily.

The system's unique indexing and cross-referencing capabilities may enable users to build applications utilizing data from multiple sources. It should be appreciated that the system may be restful—i.e., using Representational State Transfer ("REST") services. The system may use standard HTTP or HTTPS communications.

In some embodiments, the system may utilize HTTP as the underlying communication protocol. Requests for data may be transmitted using the HTTP or HTTPS GET (form-url-encoded). The response, which may be transmitted through HTTP or HTTPS may include an XML file. The response may also be transmitted using the Multipurpose Internet Mail Extensions ("MIME") standard. The MIME standard may indicate the content type of the response. A client may process, format and/or display the response, as appropriate.

XML using an HTTP protocol may include advantages when used with an API. Because HTTP is used globally, the security issues surrounding HTTP are well known in the art, and, therefore many entities have measures in place to provide access with adequate protection. Adequate protection, in some instances, may include a firewall.

Additionally, many third-party tools exist to allow communication via HTTP. The HTTP protocol is known to be relatively simple so that an average network programmer can develop software code to be used with the specification.

Furthermore, XML is similar to the well-known Hypertext Markup Language ("HTML"). XML is in human-readable format and is therefore easily understood and debugged. As a clear-text format, XML is free of the possibility of trojan-horses or other viruses. XML may be also be operating system independent.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 1 shows an illustrative diagram according to certain embodiments.

DETAILED DESCRIPTION OF THE DISCLOSURE

A system for accessing and amalgamating entity data from a plurality of inconsistent data source is provided. The data sources may be inconsistent for various reasons. The reasons may include different methods of storing data, different identifiers of identifying data, different programming languages used to access the data and any other suitable reason.

The system may include a plurality of databases. The plurality of databases may include a first database, a second database and any other suitable databases. The first database may include a first plurality of entity datasets. Each dataset, included in the first plurality of entity datasets, may relate to an entity. The first database may also include a first database identifier for each entity included in the first plurality of entity datasets.

The second database may include a second plurality of entity datasets. Each entity dataset, included in the second plurality of entity datasets, may relate to an entity. The second database may also include second database identifier for each entity included in the second plurality of entity datasets. At least one entity dataset included in the first database may relate to the same entity of at least one entity dataset included in the second database.

The system may include an indexing system. The indexing system may be configured to generate a universal identifier for each entity. The indexing system may also be configured to associate each first database identifier with the appropriate universal identifier for each entity. The indexing system may also be configured to associate each second database identifier with the appropriate universal identifier for each entity.

In some embodiments, the system may not include the first and second database. In these embodiments, the system may include references to the first and second database, references to the set of first database identifiers and references to the set of second database identifiers.

The system may include an API. The API may enable users to request identifier data from the indexing system. The API may be integrated into intranets, portals, systems and/or applications.

The request, from the user, may be a type-ahead request. The type-ahead request may include a session key parameter. The session key parameter may accept a session key for authentication.

The type-ahead request may also include a token value parameter. The token value parameter may accept an alphanumeric string.

The request may also include a universe parameter. The universe parameter may accept a designated universe type. The universe parameter may be designed to allow the user to search using different collections of databases. Each collection of databases may be labeled a universe. Examples of collections of entities may include a proprietary database, a specific database, a set of specific databases to which a user subscribes and any suitable combination of collections of databases. The designated universe type may include all available databases, all databases to which a searching entity subscribes, all public databases, a proprietary database or confidential database specific to the searching entity or any combination of databases.

The system may be configured to search the proprietary database for data relating to a secondary entity. The system may also be configured to return one or more identifiers associated with the secondary entity when an entity dataset relating to the secondary entity is located within the proprietary or confidential database.

In the event that the system fails to locate data relating to the secondary entity within the proprietary or confidential database, the system may be configured to search all the databases to which the searching entity subscribes. The system may return one or more identifiers associated with the secondary entity when the secondary entity is located within the one or more databases to which the search entity subscribes. In some embodiments, the system may return entity datasets and/or identifiers from the databases.

The request, from the user, may be a parameterized search request. The parameterized search request may include a session key parameter. The session key parameter may accept a session key for authentication.

The parameterized search request may include a token value parameter. The token value parameter may accept an alphanumeric string.

The parameterized search request may include a universe parameter. The universe parameter may accept a designated universe type. The universe parameter may be designed to allow the user to search using different collections of databases. Each collection of databases may be labeled a universe. Examples of collections of entities may include a proprietary database, a specific database, a set of specific databases to which a user subscribes and any suitable combination of collections of databases. The designated universe type may include all available databases, all databases to which a searching entity subscribes, all public databases, a proprietary database or a confidential database specific to the searching entity or any combination of databases.

Making a Request

The system may enable receipt of, and response to, different, distinct types of requests. In some embodiments, the system may enable at least three distinct types of requests. The types of requests may include the type-ahead search request, the parameterized search request and the entity data request.

The type-ahead search request may take a search string, and may return a list of results. In some embodiments, the list may include up to twenty or more results.

The parameterized search request may take a variety of search parameters, and may return a list of results. The list of results may include entity identifiers, names and any other suitable information. The list of results may enable and/or assist in selecting the correct match for a search.

The entity data request may take a system identifier and return data on one or more companies or entities.

Authentication

The system may support a user's proprietary method of authentication. The system may also support industry standard authentication, such as Security Assertion Markup Language ("SAML"). The authentication may be system specific and lightweight without relying on older authentication methods. The system may include one or more built-in authentication methods. The built-in authentication methods may include a username and password sign-on.

In order to access the API, a session key, otherwise referred to as an authentication token, may be required. The session key may be obtained in order to implement the API using REST methodology. The session key may be obtained by sending an HTTP GET request and passing a valid username and password in the HTTP header. The API may use basic HTTP authentication. Basic HTTP authentication may not require encryption.

It should be appreciated that, in some embodiments, the session key may be an alphanumeric string. In other embodiments, the session key may be a cryptographic token. In yet other embodiments, the session key may be another authentication element.

The obtained session key may be submitted with subsequent requests during a particular session. The obtained session key may be embedded in the HTTP header of all subsequent requests. A particular session may be allotted a specific time frame. In some embodiments, the time frame may be twelve hours or any other suitable time frame. In other embodiments, a particular session may be allotted a never-expire time frame. The session key may control the secure access to the API.

The following steps may be included in a process for obtaining a session key: 1. create a string with a username and password in the form "username:password" (sans quotes), 2. convert the created string to a base64 encoded string, 3. prepend the word Basic and a space to the base64 encoded string and 4. set the HTTP request's authorization header with the resulting string.

An exemplary authentication request and response data is shown below:
Method: GET
Authentication: Basic
Endpoint: http://secure.system.com/resolve/api/authenticate
Parameters: None
Request Header: Authorization: Basic {base64 encoded string}
Response Code:
Success: HTTP 200
Unauthorized: HTTP 401
Sample Request:
GET http://secure.system.com/resolve/api/authenticate
Authorization: Basic Y2lhOkZyYW5rZm9ydCM3MQ==
Response Header:
HTTP/1.1 200 OK
Cache-Control: no-cache
Date: Tue, 7 Feb. 2017 15:57:28 GMT
Content-Length: 494
Content-Type: application/json; charset=utf-8
Server: Microsoft-IIS/8.5
SessionKey: diibqocaaeuvjqxpkovylqiiipanofem X-Asp-Net-Version: 4.0.30319
X-Powered-By: ASP.NET
Response Body:

```
{
"ResolveTransactionDetail": {
    "RequestContentType": "",
    "RequestIpAddress": "127.0.0.1",
    "RequestMethod": "GET",
    "RequestTimestamp": "Tue, 07 Feb 2017 10:57:13 GMT"
},
"ResolveTransactionResult": {
    "StatusCode": 200,
    "ReasonPhrase": "OK",
    "HttpVersion": "1.1"
},
"ResolveResponseDetail": {
    "ResourceName": "Authenticate",
    "ResourceAction": "Get",
    "ResponseDetail": {
        "ResponseType": "SessionKey",
        "Response": {
            "Status": 0,
            "Value": "diibqocaaeuvjqxpkovylqiiipanofem",
            "Message": "OK",
            "Created": "Tue, 07 Feb 2017 10:57:27 GMT"
            }
        }
    }
}
```

Type-Ahead Search Request

The type-ahead search request may accept a plurality of parameters. The plurality of parameters may include a session key parameter. A session key may be required to access the API. The session key may be transmitted with the request to the API in order to authenticate the system user.

The plurality of parameters may include a token value parameter. The token value parameter may take an alphanumeric string. The string that is inputted into the token value parameter may be compared against symbols, identifiers, tickers, CUSIPs, names, former names and any other suitable data, such as those described above. The alphanumeric string may include entity data. For example, the alphanumeric string may include "Bank A" or any other suitable entity name.

The plurality of parameters may include a universe parameter. The universe parameter may be designed to allow the user to search using different collections of databases. Each collection of databases may be labeled a universe. Examples of collections of databases may include a proprietary database, a confidential database, a specific database, a set of specific databases to which a user or entity subscribes or any other suitable combinations of databases.

An exemplary link request for transmitting a type-ahead search request is as follows: http://secure.system.com/resolve/api/lookup/app.

In the above exemplary link request, a plurality of parameters may be passed. The plurality of parameters may include a token value parameter. The alphanumeric string "app" may be passed to the token value parameter. The plurality of parameters may also include a session key parameter. The session key parameter may be passed in the request header. The session key parameter may be used to determine permissions and a client universe to be searched. A valid Session Key should preferably be supplied in the HTTP header.

The above exemplary link request may be understood to mean the following: Retrieve all entities, included in a previously determined client universe, that include the alphanumeric string "app" within an identifier of the entity.

In response to transmission of a request, one or more results may be returned. Exemplary requests and results are shown below. Each result, received in response to the request, may include one or more of the following: a system identifier (system id), an entity name (entity id), a country in which the entity is located (country), the entity identifier field that matched the inputted token value (matchedfield) and the value contained in the field that matched the inputted token value (full matched value). Each result may include a variety of other attributes (not shown). The variety of other attributes may include the state in which the entity is headquartered.

In an example, the first result retrieved in the result list shown below may include a system id: 0000123. The result may also include an entity id: App Inc. App Inc. may be located in the United States. The entity identifier that matched the inputted token value may be the name of the entity. The value included in the entity identifier may be the name App Inc.

In another example, the third result retrieved in the result list shown above may include a system id: 1345543. The result may also include an entity id: Materials, Inc. Materials, Inc may be located in the United States. The entity identifier that matched the inputted token value may be the legal entity identifier ("LEI") of the entity. The value included in the entity identifier may be the LEI: APPHBKIULHYC5JBHJU14.

The lookup may accept any alphanumeric string. The alphanumeric string may be compared to symbols, identifiers, tickers, CUSIPs, names, former names or any other suitable data fields.

An exemplary type-ahead request and response data is shown below:

Method: GET
Authentication: Token
Endpoint: http://secure.system.com/resolve/api/lookup/{token}
Parameters:

| Name: | Token |
|---|---|
| Description: | Look up token |
| Required: | Yes |
| Data Type: | String |

Request Header: SessionKey: your-session-key
Response Code:
Success: HTTP 200
Unauthorized: HTTP 401
Sample Request:
GET http://resolve.system.com/api/lookup/app
SessionKey: diibqocaaeuvjqxpkovylqiiipanofem
Response Header:
HTTP/1.1 200 OK
Cache-Control: no-cache
Pragma: no-cache
Content-Type: application/json; charset=utf-8
Expires: −1
Server: Microsoft-IIS/8.0
X-AspNet-Version: 4.0.30319
X-SourceFiles: =?UTF-8?B?QzpcVXNlcnNceGxzLm5ldFxzcmNcc2l0ZVxSZXNvbHZlQXBpXHNyY1
xhcGlcbG9va3VwXGFwcA==?=
X-Powered-By: ASP.NET
Date: Tue, 7 Feb. 2017 16:58:05 GMT
Content-Length: 5526
Response Body:

```
{
    "ResolveTransactionDetail": {
        "RequestContentType": "",
        "RequestIpAddress": "::1",
        "RequestMethod": "GET",
        "RequestTimestamp": "Tue, 07 Feb 2017 11:57:52 GMT"
    },
    "ResolveTransactionResult": {
        "StatisCode": 200,
        "ReasonPhrase": "OK",
        "HttpVersion": "1.1"
    },
    "ResolveResponseDetail": {
        "ResourceName": "Lookup",
        "ResourceAction": "Get",
        "ResponseDetail": {
            "ResponseType": "Lookup",
            "Response": {
                "Id": 1,
                "Name": "resolve_lookup",
                "Results": [{
                    "UniverseId": 1,
                    "UniverseName": "led",
                    "Description": "System Legal Entity Directory",
                    "IsPrimary": true,
                    "NumResults": 20,
                    "Matches": [{
                        "systemid": 0000123,
                        "entityname": "App Inc",
                        "country": "United States",
                        "matchedfield": "name",
                        "fullmatchedvalue": "App Inc",
                        "city": "Cupertino"
                    },
                    {
                        "systemid": 1345543,
                        "entityname": " Materials, Inc.",
                        "country": "United States",
                        "matchedfield": "name",
                        "fullmatchedvalue": " APPHBKIULHYC5JBHJU14",
                        "city": "Santa Clara"
                    },
                    {
                        "systemid": 456765,
                        "entityname": " Appreciation AAR",
                        "country": "United States",
                        "matchedfield": "name",
                        "fullmatchedvalue": " Appreciation AAR",
                        "city": "Valley Forge"
                    },
```

-continued

```
                        [CONTINUE FOR 20 RESULTS]
                        {
                                "systemid": 342375456,
                                "entityname":
                                "Alkaline Bank",
                                "country": "United States",
                                "matchedfield": "BIC",
                                "fullmatchedvalue":
"APPYHT77XXX",
                                "city": "Glenwood Springs"
                        }]
                },
                {
                        "UniverseId": 2,
                        "UniverseName": "abc",
                        "Description": "AbC Autocomplete Index",
                        "IsPrimary": false,
                        "NumResults": 20,
                        "Matches": [{
                                "id": 12345678,
                                "name": "APPLIED
TRANSLATIONS",
                                "employees": 2
                        },
                        {
                                "id": 1238645,
                                "name": " APPLIANCE SERVICE ",
                                "employees": 2
                        },
                        {
                                "id": 238345003,
                                "name": "1ST APPOINTMENTS
LTD.",
                                "employees": 7
                        },
                        [CONTINUE FOR 20 RESULTS]
                        {
                                "id": 1256897,
                                "name": "ABE APPLIANCES
LIMITED",
                                "employees": 2
                        }]
                }]
            }
        }
    }
}
```

Parameterized Search Request

The parameterized search request may accept a plurality of parameters. The plurality of parameters may include a name parameter. The name parameter may accept an alphanumeric search string. Upon receipt of the alphanumeric search string by the parameterized search request, a list of company identifiers may be returned. Each company identifier included on the list of company identifiers may include the alphanumeric search string. At times, the list of company identifiers may not include an exact match to the alphanumeric string. Rather, the list of company identifiers may include a match to the alphanumeric string over a percentage of confidence, or above a confidence threshold.

The plurality of parameters may include an industry list parameter. The industry list parameter may accept a system-defined-industry identifier. The system may provide a list of industry identifiers.

In some embodiments, multiple system-defined-industry identifiers may be passed in the request. In order to pass multiple system-defined-industry identifiers, the industry list parameter may be repeated with each additional identifier to be passed.

The plurality of parameters may include a country list parameter. The country list parameter may accept a system-defined-country identifier. The system may provide a list of country identifiers.

In some embodiments, multiple system-defined-country identifiers may be passed in the request. In order to pass multiple system-defined-country identifiers, the country list parameter may be repeated with each additional identifier to be passed.

An exemplary parameterized request may return a plurality of companies that begin with "Micro" (20) that reside in the United States or the United Kingdom.

In some embodiments, the number 20 may indicate the industry identifier, or the industry type from which to retrieve entities. In other embodiments, the number 20 may indicate the maximum number of results to be shown to the user.

All parameters in the search request may be optional. At least one parameter should be passed in order to receive a substantive response.

An exemplary link request for obtaining results to a parameterized search request may be as follows: http://secure.system.com/api/entity/search.

```
POST DATA:
{
        "Search": {
```

```
            "Name": "APPLE",
            "Date of Incorporation": "",
            "Country of Incorporation": "BR",
        },
        "Paging": {
            "Page": 1,
            "PageSize": 20
        }
    }
}
```

In above exemplary link request, a plurality of parameters may be passed. The parameters to be passed may include a name parameter, a session key (sk) parameter (not shown), a date of incorporation parameter and a country of incorporation parameter. The alphanumeric string "APPLE" may be passed to the name parameter. The alphanumeric string "gtbhbtabggbpidqwerjiohj" (not shown) may be passed to the session key parameter, included in the request header (not shown). The enumerated type and/or alphanumeric string "BR", which may be an acronym for Brazil, may be passed to the country of incorporation parameter. It should be appreciated that the date of incorporation and the country of incorporation parameters may be optionally set in order to limit results of the request.

The above exemplary link request may be understood to mean: This session is authenticated using the following session key: gtbhbtabggbpidqwerjiohj. Please retrieve all entities that include the alphanumeric string "APPLE," that are incorporated in Brazil.

An exemplary API response for the parameterized search request may be shown below: An exemplary API response for the parameterized search request may be as follows:

```
{
  "ResolveTransactionDetail": {
    "RequestContentType": "application/json",
    "RequestIpAddress": "::1",
    "RequestMethod": "POST",
    "RequestUrl": "http://resolve.system.com/api/entity/search",
    "RequestTimestamp": "Fri, 23 Mar 2018 16:26:51 GMT"
  },
  "ResolveTransactionResult": {
    "StatisCode": 200,
    "ReasonPhrase": "OK",
    "HttpVersion": "1.1"
  },
  "ResolveResponseDetail": {
    "ResourceName": "Entity",
    "ResourceAction": "Search",
    "ResponseDetail": {
      "ResponseType": "ResolveSearchResults",
      "Response": {
        "Id": "1",
        "Name": "anz",
        "Description": "ANZ Resolve Search",
        "Paging": {
          "PageNumber": 1,
          "NumberOfRecords": 9,
          "PageSize": 20,
          "TotalNumberOfPages": 1,
          "TotalNumberOfRecords": 9
        },
        "Results": [
          {
            "name": "APPLE COMPUTER BRASIL LTDA",
            "address": " R LEOPOLDO COUTO MAGALHAES JUNIOR 700 ANDAR 7 E 8 CONJ 71, 72, 81 E",
            "postal_code": "04542",
            "city": "SAO PAULO",
            "country_code": "BR",
            "utl_parent": null,
            "identifiers": [
              {
                "type": "BVDID",
                "value": "BR00623904000173"
              },
              {
                "type": "CNPJ",
                "value": "00.623.904/0001-73"
              },
              {
                "type": "LEI",
                "value": "549300UJWEUFNYXPJ620"
              }
            ]
          },
          {
            "name": "APPLE COMPUTER BRASIL LTDA",
            "address": " EST ESTRADA DO CONTORNO, KM 281, SALA 17 BLOCO 2 PREDIO DAS MARCAS",
            "postal_code": "29158-001",
            "city": "CARIACICA",
            "country_code": "BR",
            "utl_parent": {
              "bvd_id": "BR00623904000173",
              "name": "APPLE COMPUTER BRASIL LTDA"
            },
            "identifiers": [
              {
                "type": "BVDID",
                "value": "BR00623904000254"
              },
              {
                "type": "CNPJ",
                "value": "00.623.904/0002-54"
              }
            ]
          },
          [CONTINUE FOR 20 RESULTS]
          {
            "name": "APPLE COMPUTER SIST DE COMPUT IND COM REPRES EXP IMP LT - ME",
            "address": " R MAEST CARDIM 94 LOJA A2",
            "postal_code": "08210-040",
            "city": "SAO PAULO",
            "country_code": "BR",
            "utl_parent": null,
            "identifiers": [
              {
                "type": "BVDID",
                "value": "BR51382307000135"
              },
              {
                "type": "CNPJ",
                "value": "51.382.307/0001-35"
              }
            ]
          }
        ]
      }
    }
  }
}
```

Detailed Entity Report—Exemplary Single/Multiple Entity Data Request

The detailed entity report—exemplary single/multiple entity data request may accept a plurality of parameters. The plurality of parameters may include a system-defined identifier. The system-defined identifier may be returned by the type-ahead search request or the parameterized search request. A valid session key may be supplied in the HTTP header of a single/multiple entity data request.

An exemplary single/multiple entity data request is shown below:
Method: GET
Authentication: Token
Endpoint: http://secure.system.com/resolve/api/report/{report-name}/{id-type}/{company-id}

Parameters:

| Name | Description | Required | Data type |
|---|---|---|---|
| Report-name | Name of the report (specific for each client) | Yes | String |
| Id-type | Type of identifier (systemid, dunsno . . .) | Yes | String |
| Company-Id | Identifier can be a System ID or a vendor or other universe id | Yes | Identifier |

The report may be a method that may enable a requestor to specify which data elements, associated with the requested entities, should be retrieved. The report may include data sets and/or fields to be retrieved. The report may be a custom report—i.e., customized to the requestor. The report may be a general report. The report may be a predefined report. The report retrieval may be supported by the API. The report may be generated as a JSON file, a PDF document, an XML file or any other suitable file.
Request Header: SessionKey: your-session-key Response Code:
  Success: HTTP 200
  Unauthorized: HTTP 401
Sample Requests:
  GET http://secure.system.com/api/report/dnb_report/systemid/D1234567
  GET http://secure.system.com/api/report/aaf_report/systemid/1001101
  SessionKey: diibqocaaeuvjqxpkovylqiiipanofem
Response Header:
  HTTP/1.1 200 OK
  Cache-Control: no-cache
  Pragma: no-cache
  Content-Type: application/json; charset=utf-8
  Expires: −1
  Server: Microsoft-IIS/8.5
  X-AspNet-Version: 4.0.30319
  X-Powered-By: ASP.NET
  Date: Tue, 7 Feb. 2017 17:59:29 GMT
  Content-Length: 6208
Response Body:

```
{
    "ResolveTransactionDetail": {
        "RequestContentType": "",
        "RequestIpAddress": "127.0.0.1",
        "RequestMethod": "GET",
        "RequestTimestamp": "Tue, 07 Feb 2017 12:59:29 GMT"
    },
    "ResolveTransactionResult": {
        "StatisCode": 200,
        "ReasonPhrase": "OK",
        "HttpVersion": "1.1"
    },
    "ResolveResponseDetail": {
        "ResourceName": "ReportSections",
        "ResourceAction": "Get",
        "ResponseDetail": {
            "ResponseType": "Report",
            "Response": {
                "Name": "resolve_report",
                "Title": "Counterparty Intelligence Report",
                "Sections": [{
                    "Id": "1",
                    "Name": "general_information",
                    "Title": "General Information",
                    "SectionItems": [{
                        "Name": "id",
                        "Display": "Id",
                        "Order": 1
                    },
                    {
                        "Name": "name",
                        "Display": "Name",
                        "Order": 2
                    },
                    {
                        "Name": "oname1",
                        "Display": "Old Name1",
                        "Order": 3
                    },
                    [CONTINUE FOR 20 MORE RESULTS]
                    {
                        "Name": "public_flag",
                        "Display": "Is Public",
                        "Order": 23
                    }],
                    "SectionContent":[{
                        "id":1001101,
                        "name": "Apple Inc",
                        "country": "United States",
                        "url":http://www.apple.com,
                        "is_listed": 1,
                        "is_rated": 1,
                        "is_regulated": 1,
                        "is_lei": 1,
```

-continued

```
            "entity_type": "Corporate",
            "public_flag": 1
        }]
    },
    {
        "Id": "2",
        "Name": "lei",
        "Title": "Legal Entity Identifier (LEI)",
        "SectionItems": [{
            "Name": "LOU",
            "Display": "LEI Source",
            "Order": 1
        },
        {
            "Name": "LEI",
            "Display": "LEI",
            "Order": 2
        {,
        }
            "Name": "EntityLegalName",
            "Display": "EntityLegalName",
            "Order": 3
        }
        [CONTINUE FOR 41 MORE RESULTS]
        {
            "Name": "LastVerified",
            "Display": "System Last Verified",
            "Order": 44
        }],
        "SectionContent":[{
            "LOU": "GMEI",
            "LEI": "HWUPKR0MPOU8FGXBT394",
            "EntityLegalName": "Apple Inc.",
            "EntityOtherEntityNames": "Apple Computer Inc",
            "LegalAddressLine1": "C/O C T Corporation System",
            "LegalAddressLine2": "818 West 7th Street",
            "LegalAddressLine3": "Suite 930",
            "LegalAddressCity": "Los Angeles",
            "LegalAddressCountry": "US",
            "LegalAddressPostalCode": "90017",
            "LegalAddressRegion": "CA",
            "HeadquartersAddressLine1"; "1 Infinite Loop",
            "HeadquartersAddressCity": "Cupertino",
            "HeadquartersAddressCountry": "US",
            "HeadquartersAddressPostalCode": "95014",
            "HeadquartersAddressRegion": "CA",
            "BusinessRegisterEntityID": "C0806592",
            "EntityLegalJurisdiction": "US",
            "EntityLegalForm": "INCORPORATED",
            "EntityEntityStatus": "ACTIVE",
            "InitialRegistrationDate": "06 Jun 2012",
            "RegistrationLastUpdateDate": "20 Dec 2016",
            "RegistrationRegistrationStatus": "ISSUED",
            "RegistrationNextRenewalDate": "13 Dec 2017",
            "RegistrationManagingLOU":
"EVK05KS7XY1DEII3R011",
            "RegistrationValidationSources":
"FULLY_CORROBORATED",
            "LastVerified": "07 Feb 2017'
        }]
    }
    }
}
}
```

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram. The illustrative diagram includes client interface 110. Client interface 110 may be an interface used by an entity to access Resolve® system 124 manufactured by Opus Global, Inc., located in New York, N.Y. Client interface 110 may be connected and/or linked to intranet 102, databases 104, customer relationship management ("CRM") tool 106 and applications 108. The data retrieved from resolve system 124 may be fed into intranet 102, databases 104, CRM tool 106, applications 108 and any other suitable network. There may be a plurality of client interfaces (not shown).

Initially, in order for client interface 110 to access resolve system 124, client interface may authenticate, as shown at 112. Client interface 110 may initiate an authentication process, shown at 114. Resolve system 124 may respond to the authentication request with JSON response with a session key, as shown at 116.

At step 2, as shown at 122, upon authentication, resolve system 124 may receive one or more search requests 118 from client interface 110. The search requests may be to search for an entity based on an entity name and/or public, proprietary or confidential entity identifiers.

Resolve system 124 may communicate with system data warehouse 132 via communication lines 134. System data warehouse 132 may include data regarding various entities. System data warehouse 132 may provide resolve system 124 with the data needed to generate JSON file 120.

In response to the request, resolve system 124 may transmit JSON file 120 to client interface 110. JSON file 120 may include data regarding the requested entity. The JSON file may also reflect permissioning, as shown 126, concordance, as shown at 128 and project code and/or usage logging, as shown at 130. Therefore, JSON file 120 may be customized based on the entity associated with client interface 110.

One of ordinary skill in the art will appreciate that the elements and steps shown and described herein may be utilized and/or performed in other than the recited system and/or order and that one or more elements illustrated may be optional. The methods of the above-referenced embodiments may involve the use of any suitable elements, elements, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for accessing and amalgamating entity data from a plurality of inconsistent data sources have been provided. Persons skilled in the art will appreciate that the present invention can be practiced by other than the described embodiments, which are presented for purposes of illustration rather than of limitation.

What is claimed is:

1. A system for accessing and amalgamating entity data from a plurality of inconsistent data sources, the system comprising:
   a plurality of databases, said plurality of databases comprising:
      a first database, said first database comprising:
         a first plurality of entity datasets, each entity dataset, included in the first plurality of entity datasets, relates to an entity; and
         a first database identifier for each entity dataset included in the first plurality of entity datasets;
      a second database, said second database comprising:
         a second plurality of entity datasets, each entity dataset included in the second plurality of entity datasets relating to an entity; and
         a second database identifier for each entity dataset included in the second plurality of entity datasets; and
   wherein at least one entity dataset included in the first database relates to the same entity of at least one entity dataset included in a second database;
      a non-transitory computer-readable medium storing computer-executable instructions which when executed executes an indexing system, said indexing system configured to:
         for a first entity and a second entity, if a score is higher than a threshold then:
            assign the first entity and the second entity a same universal identifier;
            associate each first database identifier relating to the first entity and the second entity with the same universal identifier assigned to the first entity and the second entity; and
            associate each second database identifier relating to the first entity and the second entity with the same universal identifier assigned to the first entity and the second entity; and
         an application programming interface ("API") that enables users to request identifier data from the indexing system.

2. The system of claim 1, wherein the API is integrated into intranets, portals, systems and/or applications.

3. The system of claim 1, wherein the request is a type-ahead request, said type-ahead request comprising:
   a session key parameter that accepts a session key for authentication;
   a token value parameter that accepts an alphanumeric string; and
   a universe parameter that accepts a designated universe type.

4. The system of claim 3, wherein the designated universe type is selected from the group consisting of: all available databases; all databases to which a searching entity subscribes; all public databases; a proprietary database specific to the searching entity; or any combination of databases.

5. The system of claim 4, wherein system is configured to:
   search the proprietary database for data relating a secondary entity; and
   return one or more identifiers associated with the secondary entity when an entity dataset relating to the secondary entity is located within the proprietary database.

6. The system of claim 4, wherein the system is configured to:
   search the proprietary database for data relating a secondary entity;
   fail to locate data relating to the secondary entity;
   search all the databases to which a searching entity subscribes; and
   return one or more identifiers associated with the secondary entity when the secondary entity is located within the one or more databases to which the searching entity subscribes.

7. The system of claim 1, wherein the request is a parameterized search request, said parameterized search request comprising:

a session key parameter that accepts a session key for authentication;

a token value parameter that accepts an alphanumeric string; and a universe parameter that accepts a designated universe type.

8. The system of claim 7, wherein the designated universe type is selected from the group consisting of: all available databases; all databases to which a searching entity subscribes; all public databases; a proprietary database specific to the searching entity; or any combination of databases.

9. The system of claim 8, wherein system is configured to:
search the proprietary database for data relating a secondary entity;
return one or more identifiers associated with the secondary entity when the secondary entity is located within the proprietary database;
search all the databases to which a searching entity subscribes; and
return one or more identifiers associated with the secondary entity when the secondary entity is located within the one or more databases to which the searching entity subscribes.

10. The system of claim 1, wherein the request is an entity data request, said entity data request comprising: a returned identifier parameter that accepts a system-defined identifier.

11. The system of claim 10, wherein the entity data request returns data relating to the secondary entity, said data being retrieved from substantially all databases available to the entity.

12. The system of claim 11, wherein the databases available to the entity include: all databases to which the searching entity subscribes; all public databases; a proprietary database specific to the searching entity; or any combination of databases.

13. A system for accessing and amalgamating entity data from a plurality of inconsistent data sources, the system comprising:
a plurality of databases, said plurality of databases comprising:
a first database, said first database comprising:
a first plurality of entity datasets, each entity dataset, included in the first plurality of entity datasets, relates to an entity; and
a first database identifier for each entity dataset included in the first plurality of entity datasets;
a second database, said second database comprising:
a second plurality of entity datasets, each entity dataset included in the second plurality of entity datasets relating to an entity; and
a second database identifier for each entity dataset included in the second plurality of entity datasets; and
wherein at least one entity dataset included in the first database relates to the same entity of at least one entity dataset included in a second database;
a non-transitory computer-readable medium storing computer-executable instructions which when executed executes an indexing system, said indexing system configured to:
for a first entity and a second entity, if a score is higher than a threshold then:
assign the first entity and the second entity a same universal identifier;
associate each first database identifier relating to the first entity and the second entity with the same universal identifier assigned to the first entity and the second entity; and
associate each second database identifier relating to the first entity and the second entity with the same universal identifier assigned to the first entity and the second entity; and
an application programming interface ("API") that enables users to request identifier data from the indexing system.

14. The system of claim 13, wherein the API is integrated into intranets, portals, systems and/or applications.

15. The system of claim 13, wherein the request is a type-ahead request, said type-ahead request comprising:
a session key parameter that accepts a session key for authentication;
a token value parameter that accepts an alphanumeric string; and
a universe parameter that accepts a designated universe type.

16. The system of claim 15, wherein the designated universe type is selected from the group consisting of: all available databases; all databases to which a searching entity subscribes; all public databases; a proprietary database specific to the searching entity; or any combination of databases.

17. The system of claim 16, wherein system is configured to:
search the proprietary database for data relating a secondary entity; and
return one or more identifiers associated with the secondary entity when an entity dataset relating to the secondary entity is located within the proprietary database.

18. The system of claim 16, wherein the system is configured to:
search the proprietary database for data relating a secondary entity;
fail to locate data relating to the secondary entity;
search all the databases to which a searching entity subscribes; and return one or more identifiers associated with the secondary entity when the secondary entity is located within the one or more databases to which the searching entity subscribes.

19. The system of claim 13, wherein the request is a parameterized search request, said parameterized search request comprising:
a session key parameter that accepts a session key for authentication;
a token value parameter that accepts an alphanumeric string; and
a universe parameter that accepts a designated universe type.

20. The system of claim 19, wherein the designated universe type is selected from the group consisting of:
all available databases;
all databases to which a searching entity subscribes;
all public databases;
a proprietary database specific to the searching entity;
or any combination of databases.

* * * * *